United States Patent
Sulzbach et al.

[11] Patent Number: 6,019,919
[45] Date of Patent: Feb. 1, 2000

[54] PROCESS FOR FOAM PRODUCTION USING CARBON DIOXIDE DISSOLVED UNDER PRESSURE

[75] Inventors: Hans-Michael Sulzbach, Königswinter; Ferdinand Althausen, Neunkirchen-Seelscheid; Reiner Raffel, Siegburg; Robert Eiben; Wilfried Ebeling, both of Köln, all of Germany

[73] Assignees: Bayer Aktiengesellschaft; Hennecke GmbH, both of Leverkusen, Germany

[21] Appl. No.: 08/887,584

[22] Filed: Jul. 3, 1997

[30] Foreign Application Priority Data

Jul. 5, 1996 [DE] Germany .................. 196 27 065

[51] Int. Cl.[7] .................................................. B29C 44/20
[52] U.S. Cl. ..................... 264/50; 264/45.8; 264/51; 264/DIG. 77
[58] Field of Search .................... 264/45.8, 50, DIG. 77, 264/51

[56] References Cited

U.S. PATENT DOCUMENTS

| | | | |
|---|---|---|---|
| 2,774,106 | 12/1956 | Bethe | 264/51 |
| 3,181,199 | 5/1965 | Voelker | 425/4 R |
| 3,184,419 | 5/1965 | Merriman | 260/2.5 |
| 3,325,823 | 6/1967 | Boon | 264/54 |
| 3,786,122 | 1/1974 | Berg | 264/46.2 |
| 4,177,029 | 12/1979 | Goldsworthy et al. | 425/112 |
| 5,665,287 | 9/1997 | Fiorentini et al. | 264/50 |

FOREIGN PATENT DOCUMENTS

| | | |
|---|---|---|
| 645226 | 3/1995 | European Pat. Off. . |
| 803771 | 10/1958 | United Kingdom . |
| 2301595 | 4/1996 | United Kingdom . |
| WO 92/07650 | 5/1992 | WIPO ................. 264/50 |

OTHER PUBLICATIONS

Becker/Braun, Kunststoff–Handbuch, vol. 7, Polyurethane (month unavailable) Figures 4.8 & 4.9, p. 148.

Primary Examiner—Allan R. Kuhns
Attorney, Agent, or Firm—Joseph C. Gil; Noland J. Cheung

[57] ABSTRACT

A process and device for the continuous production of slabstock foam by foaming a polyurethane reactive mixture containing carbon dioxide dissolved under pressure, comprising the steps of a) feeding said polyurethane reactive mixture into a linear extended pressure distribution chamber at a pressure above that of the solubility vapor pressure of said dissolved carbon dioxide, b) reducing pressure to a pressure below said solubility vapor pressure of said dissolved carbon dioxide in a linear extended pressure reduction zone, c) feeding said polyurethane reactive mixture from said pressure reduction zone into a foaming chamber with a widening cross-section of flow to form a foamed reactive mixture, and d) applying said foamed reactive mixture (froth) substantially perpendicularly and free-flowing onto a conveyer belt of a continuous slabstock foam plant.

1 Claim, 4 Drawing Sheets

PROCESS FOR FOAM PRODUCTION USING CARBON DIOXIDE DISSOLVED UNDER PRESSURE

FIELD OF THE INVENTION

The present invention relates to a process and a device for producing foams using carbon dioxide dissolved under pressure as a blowing agent, wherein the material to be expanded is mixed with preferably liquid carbon dioxide under pressure and then the pressure is released to produce foam. Expandable materials which may be used are, in particular, liquid starting products for plastic materials which cure to give expanded plastic materials due to a polyaddition or polycondensation reaction which takes place after the foaming process. The invention relates specifically to polyurethane foams.

BACKGROUND OF THE INVENTION

When producing polyurethane foams, a liquid or gaseous blowing agent is added to at least one of the reactive components (polyisocyanate and compounds with isocyanate-reactive hydrogen atoms, and in particular, polyols). This is then mixed with the other component and the obtained mixture is fed batchwise into a mold or continuously onto a conveyer belt, where the mixture expands and cures.

A number of processes have been widely used in the industry to produce the foam. In one process, liquids which evaporate at low temperature such as low molecular weight chlorofluorocarbons, methylene chloride, pentane, etc. which evaporate out of the liquid reactive mixture and form bubbles (physical foam production), are used. Furthermore, air may be forced into the reactive mixture or into one of the components (mechanical foam production). Finally, when expanding polyurethanes, water may be added to the polyol component as a blowing agent, which releases carbon dioxide as a foam-producing gas admixture with the isocyanate component, due to reaction with the isocyanate (chemical foam production).

In order to protect the environment and for occupational safety reasons, and also due to the comparatively high solubility of liquid carbon dioxide in the polyol component, liquid carbon dioxide has already been suggested several times as a blowing agent (GB-A 803,771, U.S. Pat. No. 3,184,419). However, these previous suggestions have not hitherto been used in an industrial scale process, obviously due to the difficulties in reducing the pressure of the reactive mixture from pressures of between 10 and 20 bar to atmospheric pressure in order to produce homogeneous foams. There is the problem, on the one hand, that carbon dioxide evaporates fairly suddenly after the pressure is reduced so that a very large increase in volume, by a factor of about 10, for example, occurs in the reaction mixture which is difficult to control and, on the other hand, the reactive mixture tends to delay the release of carbon dioxide which may be at 3 to 6 bar below the equilibrium vapor pressure of $CO_2$ at the particular temperature, so that sudden and explosive evolution of the carbon dioxide takes place, resulting in large bubbles or holes being produced in the expanded material.

Furthermore, in order to produce a uniform expanded foam structure, it is known that finely dispersed air or nitrogen bubbles can be introduced into the liquid reactive mixture. These bubbles act as bubble seeds such that the local supersaturation of the physically dissolved or chemically produced blowing agent is inhibited.

However, when using physically dissolved carbon dioxide as a blowing agent, there is the problem that evolution of carbon dioxide takes place within the time interval during which the polyaddition reaction has barely initiated such that the froth obtained after evolution of the carbon dioxide is still very sensitive to the effects of shear forces. Shear forces acting on the froth can destroy the foam bubbles such that larger bubbles are formed and an irregular foam structure is produced. This is the case, in particular, when the foam bubbles reach a diameter at which the shape of the bubbles differs from a spherical shape, i.e. when the bubble volume in the froth occupies a fraction of the space which is greater than that corresponding to the closest packed arrangement of spheres. A bubble volume which corresponds to the closest packed arrangement of spheres is achieved when 0.5 parts by wt. of carbon dioxide at atmospheric pressure are released per 100 parts of reactive mixture.

During continuous production of blocks of expanded material (see Becker/Braun, Kunststoffhandbuch, vol. 7: Polyurethane, 1993, FIGS. 4.8 and 4.9, page 148) application of the froth onto the conveyer belt and its distribution over the width of the conveyer belt are regarded as problematical for the froth.

To overcome froth deposition and distribution problems on the conveyer belt, EP-A 645,226 suggests first distributing the polyurethane reactive mixture containing carbon dioxide under pressure over the width of the conveyer belt on the pressure side, in a so-called pressure compensation chamber, then decreasing the pressure in a pressure reduction zone extending over the width of the conveyer belt. The pressure reduction zone is designed in the form of gaps or a number of drilled holes extending over the width of the conveyer belt and representing an adequate resistance to flow. A foaming chamber is then provided, which extends transversely over the conveyer belt and widens in the direction of flow, from which the froth is intended to emerge with a flow-rate adapted to the speed of the conveyer belt. The disadvantages of EP-A 645,226 are the relatively long residence time of the froth in the foaming chamber, the relatively large proportion of foaming chamber wall and foaming chamber cross-section and the difficulty of avoiding differences between the flow-rate of the froth when discharged from the foaming chamber and that of the conveyer belt. In particular, enlarged foam bubbles, formed due to shear of the froth at the lower boundary wall of the foaming chamber and during transfer from the foaming chamber to the conveyer belt, can no longer disappear into the surroundings as a result of the bursting and discharge of included gas because they are covered by froth. Rather, these types of enlarged gas bubbles migrate to the lower face of the frothing material during the progressive polyaddition reaction and are included in the foam which is produced.

SUMMARY OF THE INVENTION

The invention provides a process for the continuous production of slabstock foam by foaming a polyurethane reactive mixture containing carbon dioxide dissolved under pressure, wherein the reactive mixture is fed into a linear extended pressure distribution chamber at a pressure above that of the solubility pressure for the dissolved carbon dioxide, the pressure is reduced to a pressure below the solubility pressure of the dissolved carbon dioxide in a linear extended pressure reduction zone, the mixture is fed from the pressure reduction zone into a foaming chamber with a widening cross-section of flow and the foamed reactive mixture (froth) is applied substantially perpendicularly and free-flowing onto the conveyer belt of a continuous slabstock foam plant.

DETAILED DESCRIPTION OF THE INVENTION

Figure 1:
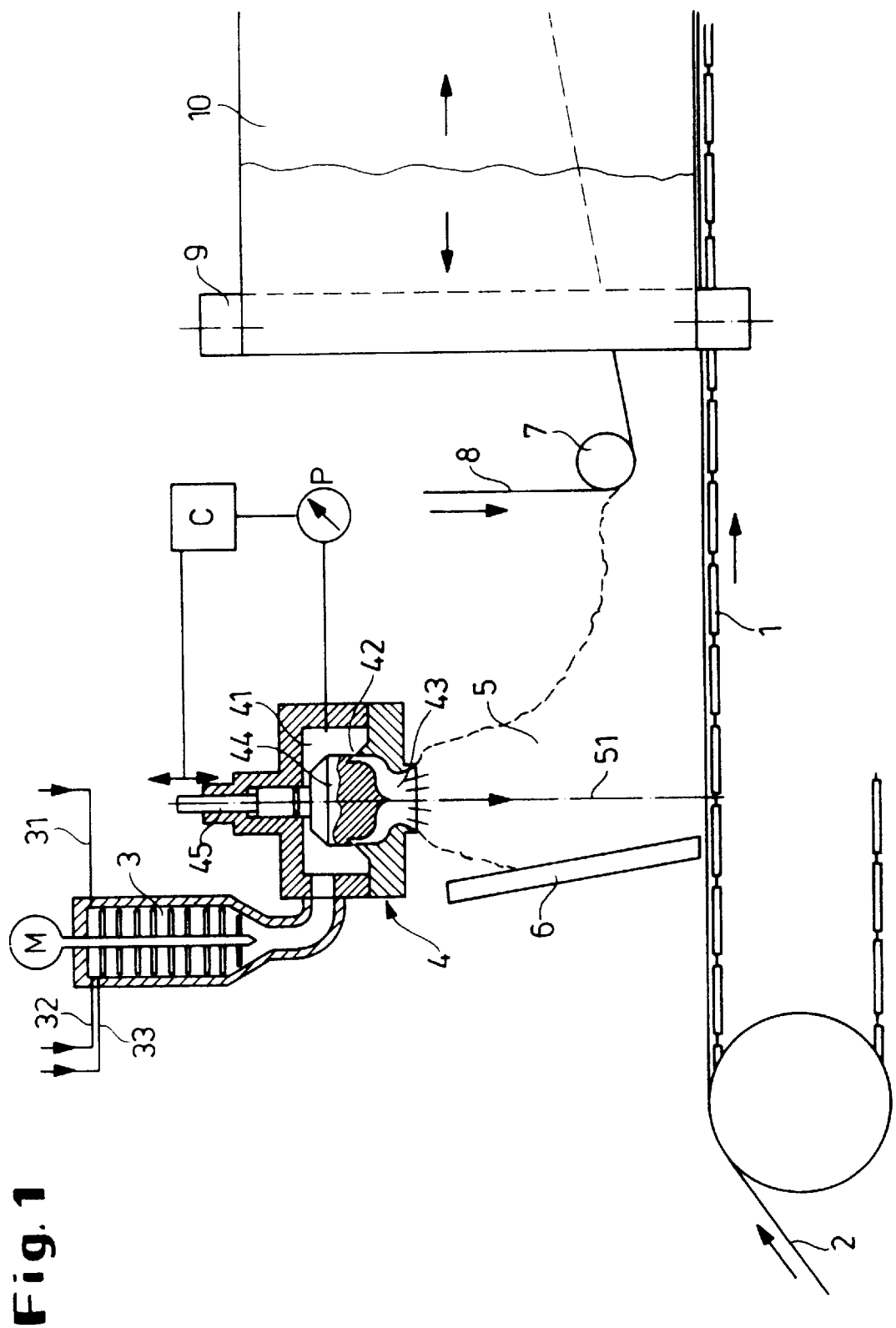
FIG. 1 shows a schematic view from the side of a first device for performing the process according to the present invention.

Since the foamed reactive mixture is applied in a substantially free-flowing state to the conveyer belt, large foam bubbles produced at the boundary wall of the foaming chamber can burst after discharge of the foamed reactive mixture from the foaming chamber so that the gas contents escape and the foamed reactive mixture does not contain large foam bubbles. Flowing of the foamed reactive mixture onto the conveyer belt to produce uniform distribution takes place at relatively small rates of shear which do not damage the foam.

The linear extent of the pressure distribution chamber and the pressure reduction zone may be designed to extend in a straight line over the width of the conveyer belt so that transverse distribution of the froth over the width of the conveyer belt may basically not be required.

For reasons of handling, i.e. to enable a compact method of construction for the device for producing the froth, the linear extension is preferably designed to be circular, wherein the pressure distribution chamber is in the form of a circular channel and the pressure reduction zone is designed in the form of an annular gap or a number of circular drilled holes located alongside each other. The foaming chamber is then designed as a circular channel with a widening cross-section of flow on the side of the pressure reduction zone, wherein the widening of the cross-section is substantially produced by reducing the radius of the internal circular channel boundary surface until the internal circular boundary surface terminates in a point such that the foaming chamber has an exit defined only by the external circular channel boundary surface. The perfectly circular design of the foam-producing device also has the advantage that this has only minimal boundary surfaces for the flow of the foamed reactive mixture so that again, interference with the foam is minimal.

"Substantially perpendicularly" in the context of the invention is intended to include an inclination of the center plane or axis of the exit opening of the foaming chamber of 30° to the vertical. Preferably, however, the angle should not be greater than 20°.

According to a preferred embodiment of the present invention, the direction of flow of the reactive mixture after being discharged from the pressure reduction zone is turned through an angle of at least 90°, preferably at least 270°, wherein the cross-section of flow of the foaming chamber after deflection is at least 5 times, preferably at least 10 times larger than the cross-section of flow in the pressure reduction zone. The cross-section of flow at the discharge opening from the foaming chamber may be at least 50 times, preferably at least 100 times greater than the cross-section of flow in the pressure reduction zone. In a most preferred embodiment, the discharge cross-section from the foaming chamber is 100 to 200 times greater than the cross-section of flow in the pressure reduction zone. The pressure reduction zone in a further preferred embodiment of the present invention is an annular gap, wherein the boundary surface of the pressure reduction zone, the internal boundary surface of the pressure distribution circular chamber and the internal boundary surface of the foaming circular chamber is designed in the form of a central body which can move in an axial direction. The width of the gap in the pressure reduction zone can be adjusted by the axial movement of this body. Preferably, a pressure measuring device is also provided on the pressure side of the pressure distribution chamber or in the supply pipe to the pressure distribution chamber, wherein the actual value of the pressure is used to control the drive device for axially shifting the central body. In this way, it is possible, depending on the volume flow of the polyurethane reactive mixture being supplied, which is preferably kept constant, to regulate the pressure in the pressure distribution chamber by regulating the width of the gap in the pressure reduction zone, in particular, to keep this pressure constant.

The extension of the pressure reduction zone in the direction of passage, i.e. at right-angles to its linear extension, may be from 0.1 to 20 mm, preferably from 1 to 10 mm, most preferably, from 3 to 8 mm. The width of the gap in the pressure reduction zone may be between 0.1 and 0.5 mm, depending on the viscosity of the polyurethane reactive mixture and its rate of feed. When using a polyurethane reactive mixture which contains a filler, gap widths of from 0.3 to 0.5 mm are preferred. The rate of discharge of foamed reactive mixture from the foaming chamber may be between 0.05 and 2 m/sec.

The foam-producing device according to the present invention is preferably operated so that about 20 to 50% of the dissolved carbon dioxide has been released when discharged from the foaming chamber so that after discharge of the (partly) foamed reactive mixture from the foaming chamber, the stream of reactive mixture expands in the shape of a bell while the carbon dioxide, which is still in solution (supersaturation) is released.

The rate of passage of the reactive mixture through the pressure reduction zone depends on the extent of the pressure reduction zone in the direction of flow, the width of the gap, the viscosity of the reactive mixture and the pressure maintained in the pressure distribution chamber. Typical rates of passage may be between 1 and 25 m/sec. When reactive mixtures with high carbon dioxide contents, e.g. in the range between 3 and 6 wt. % of carbon dioxide, are foamed, high rates of passage through the pressure reduction zone are preferred, e.g. between 15 and 25 m/sec, so that short residence times are obtained in the foaming device.

The polyurethane reactive mixture being supplied to the foaming device according to the present invention is prepared as follows:

Aliphatic, cycloaliphatic, araliphatic, aromatic and heterocyclic polyisocyanates such as those described, for instance, by W. Siefkin in Justus Liebigs Annalen der Chemie, 562, pages 75 to 136, are used as the isocyanate component.

Aromatic polyisocyanates are preferably used, in particular generally readily accessible industrial grade polyisocyanates, e.g. 2,4- and 2,6-toluylene diisocyanate and any mixture of these isomers ("TDI"), polyphenyl-polymethylene polyisocyanates such as these prepared by aniline/formaldehyde condensation followed by phosgenation ("crude MDI") and polyisocyanates with carbodiimide, urethane, allophanate, isocyanurate, urea or biuret groups ("modified polyisocyanates"), in particular, those modified polyisocyanates which are derived from 2,4- and/or 2,6-toluylene diisocyanate.

The second component ("polyol component") comprises compounds with at least two hydrogen atoms capable of reacting with isocyanates and with molecular weights generally in the range between 60 and 5000, preferably between 100 and 2000, in particular, between 200 and 800. These are understood to include, in addition to compounds containing amino groups, thiol groups or carboxyl groups, preferably compounds containing hydroxyl groups, in particular 2 to 8 hydroxyl groups, especially those with molecular weights between 200 and 2000, preferably 300 to 1200, e.g. polyesters, polyethers, polythioethers, polyacetals, polycarbonates and polyesteramides which contain at least 2, generally 2 to 8, but preferably 2 to 6 hydroxyl groups, such as those known per se for the preparation of polyurethane foams; in particular, polyetherpolyols.

The compounds described on pages 6 to 9 of EP-B 121,850 are suitable for use as the polyol component.

Furthermore, water, other blowing agents, foam stabilizers, catalysts and other auxiliary agents and additives known per se may optionally be used to produce the reactive mixture. These agents known per se which may be used are disclosed on pages 9 to 11 of EP-B 121,850.

Water, in an amount of, in particular, 1 to 7 wt. % with respect to the reactive mixture is particularly preferably used as an additional blowing agent according to the present invention. Water is preferably used in an amount from 2 to 5 wt. %.

The additional agents which can be used may be fed separately to the mixing unit for mixing the isocyanate component and the polyol component or else may be added to one of the two main components prior to mixing isocyanate with polyol, wherein the water being used and any other added components reacting with isocyanate should be added only to the polyol component.

Figure 4:
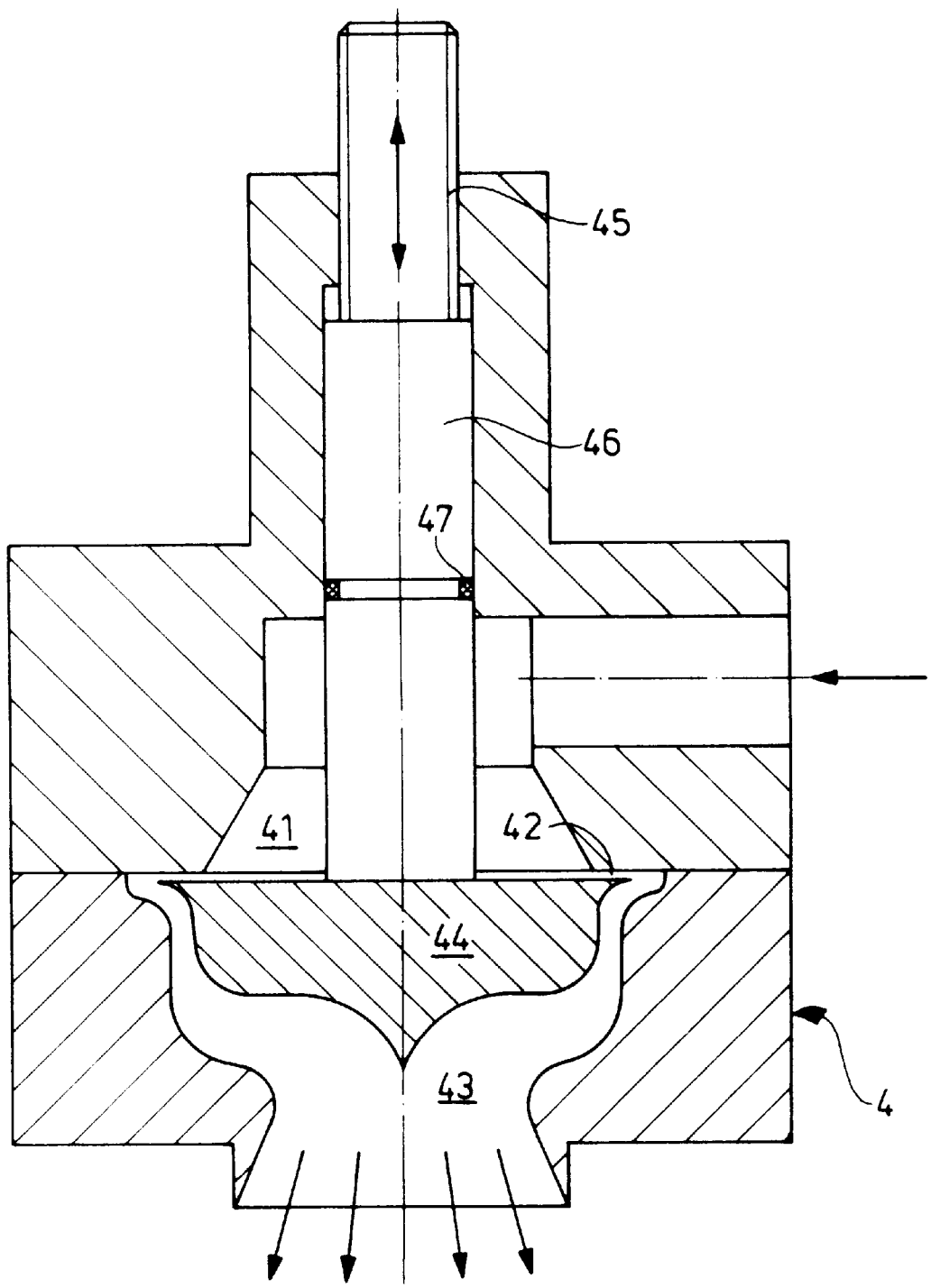
FIG. 4 shows an alternative embodiment of the foam-producing device according to FIG. 3.

The process engineering for preparing polyurethane foams is described in principle in Becker/Braun, Kunststoff-Handbuch, vol. 7, Polyurethane, 1993, pages 143 to 149, in particular, in FIGS. 4.8 and 4.9 on page 148.

The components are preferably mixed in a so-called low-pressure agitated mixing chamber, wherein the pressure in the mixing chamber, according to the present invention, is above that of the saturation vapor pressure of the dissolved carbon dioxide.

Carbon dioxide is dissolved in one or more of the components, preferably, the polyol component, before introducing the components into the mixing head. Carbon dioxide is preferably dissolved in an amount of 1 to 7 wt. %, preferably 2 to 5 wt. %, with respect to the entire reactive mixture.

Dissolution of carbon dioxide, preferably only in the polyol component, may be achieved in any way at all, e.g.

a) gaseous carbon dioxide is incorporated into the polyol using an agitator in a container containing the polyol component which is held at a pressure of 15 to 25 bar;

b) liquid carbon dioxide is mixed with the polyol at room temperature, e.g. in a static mixer, at a pressure of 70 to 80 bar and then the pressure is reduced to 15 to 25 bar before introduction to the low-pressure agitated mixing head;

c) liquid carbon dioxide, cooled to e.g. −20° C., is mixed with the polyol component which is at room temperature at a pressure of 15 to 25 bar, wherein mixing is performed so that the carbon dioxide dissolves in the polyol component before it can vaporize.

It was found that in particular the preferred alternative c) is successful, due to the high tendency of carbon dioxide to go into solution, using a high-speed continuous stirrer which is arranged in the polyol pipe at the inlet point for carbon dioxide.

The components in the reactive mixture, at least one of which contains dissolved carbon dioxide, are now fed to the mixing head, mixed here and after discharge from the mixing head are fed to the foaming device according to the invention. The conveyer belt 1 for a slabstock foam unit is shown from the side in FIG. 1. A lower laminating film 2 is fed to the conveyer belt 1, which moves to the right at a speed of 3 to 7 m/min with the conveyer belt. Isocyanate 31 and polyol 32, which may contain 3 to 7 wt. % of carbon dioxide, and any other auxiliary agents and additives 33, are fed under pressure to mixing unit 3. The pressure in the mixing unit 3 is held at a pressure which is greater than that of the solution vapor pressure of the dissolved carbon dioxide. The reaction mixture is fed from mixing unit 3 into foam-producing device 4. Foam-producing device 4 consists of a pressure distribution chamber 41 in the shape of a circular channel, a pressure reduction zone 42 in the shape of a circular channel and foaming a chamber 43. The central body 44 forming the internal boundary of the circular channel can be shifted in the axial direction using screw thread 45 to adjust the width of the gap in the pressure reduction zone 42. This is preferably performed by measuring the pressure in the pressure reduction zone 41 using pressure measuring equipment P, which actuates a drive device (not shown) for screw thread axle 45 via control unit C. The partly foamed reaction mixture, which is supersaturated with carbon dioxide, emerges from the foaming chamber as a froth 5 in the direction of the dash-and-dotted line 51, free-flowing in a substantially perpendicular direction onto conveyer belt 1. The heap of froth 5 forming below circular-symmetrical foaming device 4 is initially distributed in a free-flowing manner over the width of the conveyer belt, wherein a substantially perpendicular barrier 6 is provided to prevent flow in the opposite direction to that of the conveyer belt, thus extending in the transverse direction over the conveyer belt. In the direction of motion of the conveyer belt, at a distance from the point where the froth is supplied to the conveyer belt 1, upper laminating film 8 is supplied via a deflection roller 7 which dips into the froth. Furthermore, lateral laminating films 10 are supplied at both sides of the conveyer belt 1 via deflection rollers 9.

Figure 2:
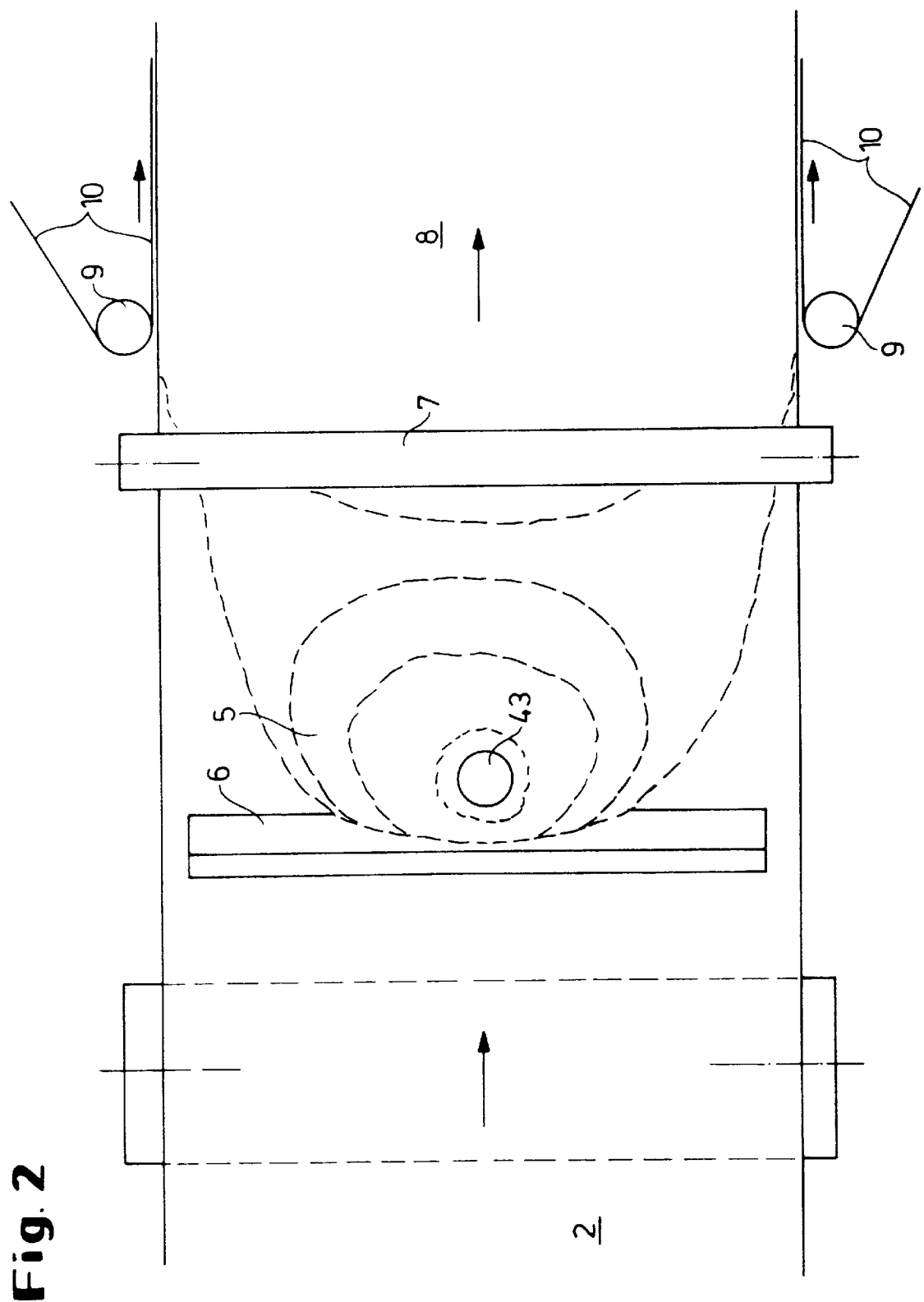
FIG. 2 shows a schematic view from above of the device in accordance with FIG. 1.

The reference numbers on the view from the top of the device according to FIG. 1, shown in FIG. 2, refer to the same elements as in FIG. 1.

Figure 3:
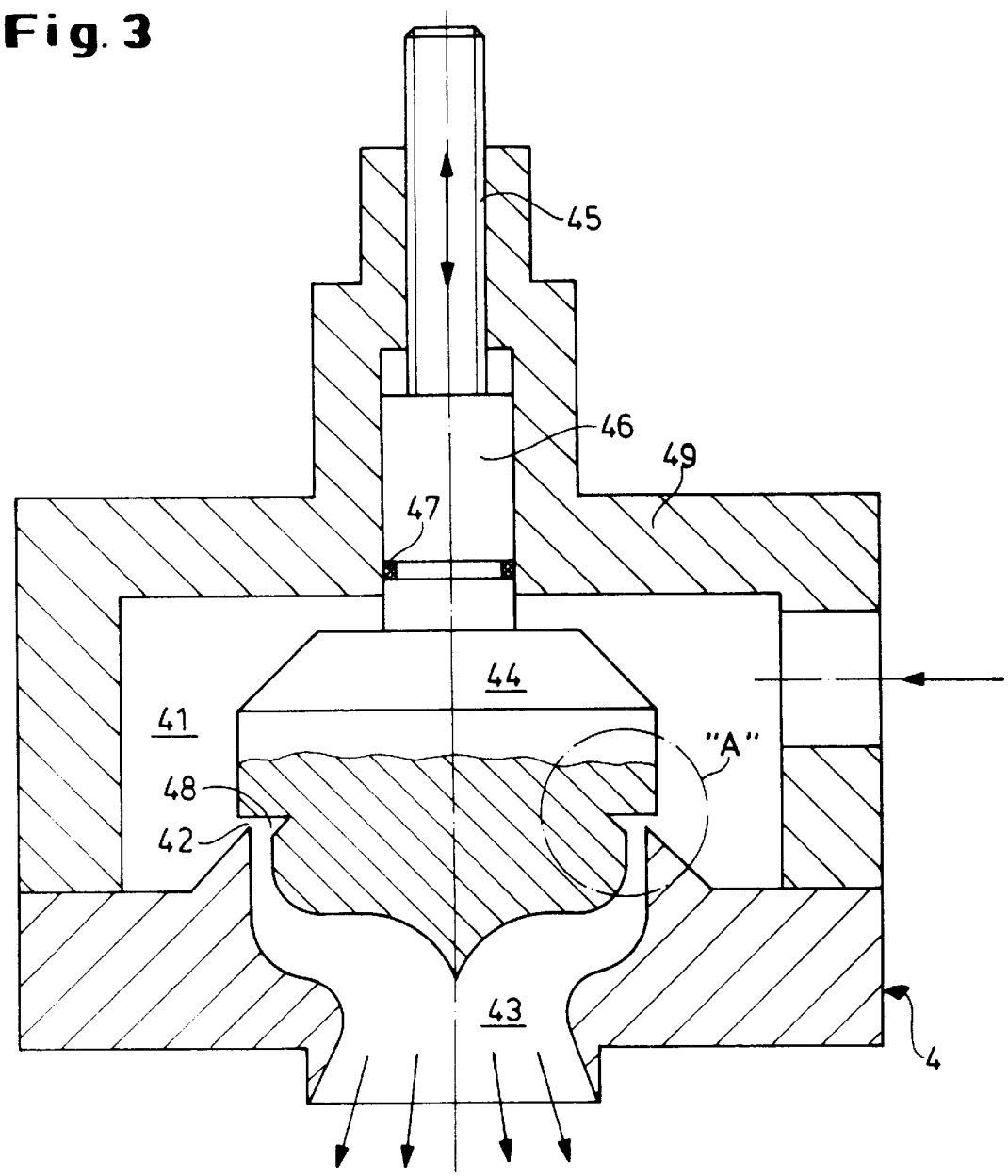
FIG. 3 shows a detailed drawing of a foaming device according to the present invention.
Figure 3A:
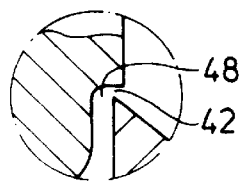
FIG. 3a shows an embodiment alternative version of detail A (pressure reduction zone) in FIG. 3
Figure 3B:
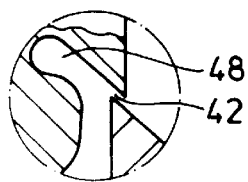
FIG. 3b and FIG. 3c show further embodiment alternative versions of detail A (pressure reduction zone) in FIG. 3.
Figure 3C:
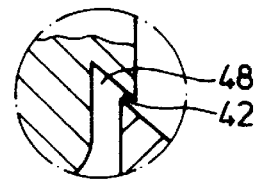

FIG. 3 shows an enlarged cross-section of foam-producing device 4. This consists of a central body 44 which forms the internal boundary for the pressure distribution chamber 41, the pressure reduction zone 42, and the foaming chamber 43. The central body 44 has a guide axle 46 which is sealed against the housing 49 by means of sealing ring 47. The axle 46 is extended in the axial direction by the screw thread 45, by means of which, using the (not shown) rotational drive, the central body 44 can be shifted vertically inside the housing 49 so that the free cross-section of passage in the pressure reduction zone 42 can be controlled in order to regulate the pressure inside the pressure distribution chamber 41. To reduce the rate of flow of the reactive mixture after passage through the pressure reduction zone 42, the direction of flow is turned through an angle of at least 90°, wherein a turning chamber 48 may be provided for turbulent degradation of the kinetic energy of the reaction mixture.

The foam-producing device 4 in accordance with FIG. 4 differs from FIG. 3 in that the pressure reduction zone 42 is flowed through radially in an outward direction. This has the advantage that the pressure distribution chamber 41 has a smaller volume than that shown in FIG. 3 so that the residence time of the reactive mixture in the pressure distribution chamber can be shorter.

The invention is further illustrated but is not intended to be limited by the following examples in which all parts and percentages are by weight unless otherwise specified.

EXAMPLES

Example

A plant for the continuous production of polyurethane slabstock foam in accordance with FIG. 1 is used. The conveyer belt speed is 3.5 m/min. The width of the conveyer belt is 2 m, the distance between upper laminating film 8 and lower laminating film 2 is 1.2 m. A foam-producing device in accordance with FIG. 4 is used. The pressure reduction zone 42 has a gap width of 0.3 mm, an extension in the direction of passage of 6.8 mm and a discharge perimeter (linear extent) of 400 mm. The radius of the discharge opening of foaming chamber 43 is 60 mm.

A foamable reactive mixture with the following composition is produced in mixing unit 3 (FIG. 1): 100 parts by wt. of a polyetherpolyol with an OH value of 45, containing 85 wt. % of propylene oxide units and 15 wt. % of ethylene oxide units, started on trimethylolpropane, 4.2 parts by wt. of water,
4.0 parts by wt. of $CO_2$,
1.3 parts by wt. of a silicone stabilizer,
0.15 parts by wt. of an amine catalyst,
0.16 parts by wt. of tin octoate,
50 parts by wt. of toluylene diisocyanate 80/20.

The polyol, water and liquid $CO_2$ are pre-mixed at 70 bar in a static mixer, the pressure is reduced to 15 bar and the mixture is passed through pipe 32 into mixing unit 3 and there mixed with the isocyanate and the other additives.

The pressure in the pressure reduction zone 41 was 11 bar. 135 kg of reactive mixture were conveyed per minute.

The reactive mixture emerged while still foaming from the foam-producing device as a stable, greatly expanded froth which spread out onto the conveyer belt. A few meters beyond the point of contact with the conveyer belt the froth began to rise due to the reaction of water with the isocyanate. After about 6 m the maximum block height of 1.2 m was reached.

A foam block with a density of 16.1 $kg/m^3$ was obtained.

The foam was open-pored and had 16 to 19 pores per cm. It was substantially free of holes and pores with diameters greater than 2 mm.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the continuous production of slabstock foam by foaming a polyurethane reactive mixture containing carbon dioxide dissolved under pressure, comprising the steps of a) feeding said polyurethane reactive mixture into a linear extended pressure distribution chamber at a pressure above that of the solubility vapor pressure of said dissolved carbon dioxide, b) reducing pressure to a pressure below said solubility vapor pressure of said dissolved carbon dioxide in a linear extended pressure reduction zone, wherein the linear extent of said pressure distribution chamber and said pressure reduction zone is designed in the shape of a circular ring and said foaming chamber is designed on the inlet side as a circular chamber and on the outlet side as a circular diffusor chamber, c) feeding said polyurethane reactive mixture from said pressure reduction zone into a foaming chamber with a widening cross-section of flow to form a foamed reactive mixture, and d) applying said foamed reactive mixture (froth) substantially perpendicularly and free-flowing onto a conveyer belt of a continuous slabstock foam plant.

\* \* \* \* \*